US 12,353,939 B2

United States Patent
Krishnaswamy et al.

(10) Patent No.: US 12,353,939 B2
(45) Date of Patent: Jul. 8, 2025

(54) LONG DISTANCE WIRELESS RADIO TAG WITH RF ENERGY HARVESTING

(71) Applicant: Wisconsin Alumni Research Foundation, Madison, WI (US)

(72) Inventors: Bhuvana Krishnaswamy, Madison, WI (US); Yaman Sangar, Madison, WI (US); Kai Pederson, Palatine, IL (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 18/503,253

(22) Filed: Nov. 7, 2023

(65) Prior Publication Data
US 2024/0152722 A1    May 9, 2024

Related U.S. Application Data

(60) Provisional application No. 63/382,947, filed on Nov. 9, 2022.

(51) Int. Cl.
*G06K 19/077* (2006.01)
*G06K 19/07* (2006.01)

(52) U.S. Cl.
CPC ... *G06K 19/07773* (2013.01); *G06K 19/0709* (2013.01)

(58) Field of Classification Search
CPC .............. G06K 19/0773; G06K 19/0709
USPC ........................................... 235/492
See application file for complete search history.

(56) References Cited

U.S. PATENT DOCUMENTS

| 8,957,763 | B2* | 2/2015 | Whitaker | G11C 8/18 340/10.51 |
| 9,864,882 | B1* | 1/2018 | Geist | G06K 7/10158 |
| 2011/0181399 | A1 | 7/2011 | Pollack et al. | |
| 2016/0048353 | A1* | 2/2016 | Nakashima | G06F 12/1441 711/103 |
| 2017/0108585 | A1* | 4/2017 | Huang | H02J 50/20 |
| 2018/0330216 | A1* | 11/2018 | Wendling | G06K 19/07345 |
| 2019/0005368 | A1 | 1/2019 | Lektomiller | |
| 2020/0076240 | A1* | 3/2020 | Papadopoulos | H04Q 9/00 |
| 2020/0285925 | A1* | 9/2020 | Salman | H02J 50/001 |
| 2021/0249901 | A1 | 8/2021 | Mennekens | |

FOREIGN PATENT DOCUMENTS

WO    2020208412 A1    10/2020
WO    2021245039 A1    12/2021

OTHER PUBLICATIONS

International Search Report for PCT/US2023/036989.

* cited by examiner

*Primary Examiner* — Ahshik Kim
(74) *Attorney, Agent, or Firm* — Boyle Fredrickson SC

(57) ABSTRACT

A long-range radio tag uses radio energy harvesting and separates the functions of radiofrequency excitation and radio tag reading such that the reader may be displaced at a substantial distance from the radio tags. The ability of the radio tags to communicate with a distant reader is further enhanced by a query system which allows a highly simplified message to be transmitted by the radio tags, as flexibly defined by a received query. The use of addressing and frequency multiplexing system allows a large number of tags to be serviced by a single reader.

14 Claims, 3 Drawing Sheets

LONG DISTANCE WIRELESS RADIO TAG WITH RF ENERGY HARVESTING

CROSS REFERENCE TO RELATED APPLICATION

This application claims the benefit of U.S. provisional application 63/382,947 filed Nov. 9, 2022 and hereby incorporated by reference.

STATEMENT REGARDING FEDERALLY SPONSORED RESEARCH OR DEVELOPMENT

BACKGROUND OF THE INVENTION

The present invention relates to radio tags allowing for remote interrogation, and in particular, to a radio tag providing increased communication distance of sensor values or the like.

Radio frequency identification (RFID) provides a low-cost method of tracking objects or conveying data without direct contact or line-of-sight communication. Passive RFID tags operate by scavenging radiofrequency energy from a reader unit positioned in the vicinity of the RFID tag to power its internal circuitry. The passive RFID tag communicates information to the reader, during the transmission of radiofrequency power to the RFID tag by a reader, by changing its electrical characteristics to either absorb or reflect the incoming radiofrequency power. The reader detects the resulting change in backscatter to read the communicated data from the RFID tag. Because passive RFID systems do not require batteries, instead working primarily on reflected power, the RFID tags can be long-lived and inexpensive.

The range of passive RFID tags is constrained by three factors. The first is that the reflected energy to the reader rapidly decreases with distance between the reader and the RFID tag both with respect to the forward path from the reader to the RFID tag and in the reverse path of reflection (dual path loss). The second factor is the reduction in energy available for harvesting by the RFID tag as the distance between the RFID tag and reader increases, this energy being necessary to activate the RFID tag electronics (energy harvesting range). The third factor is a self interference at the RFID tag reader between its own transmitted signal harvested by the RFID tag and the reflected signal from the RFID tag, this interference limiting the sensitivity of the reader (self-interference).

Some of these drawbacks can be addressed through active RFID tags which include a battery or an independent power source, for example, from photovoltaic devices. Such active RFID tags typically employ a radio transmitter (rather than backscatter communication) requiring a relatively high capacity battery that substantially increases the cost and reduces the active life of the active RFID tag compared to a passive RFID tag, greatly limiting its potential applications.

SUMMARY OF THE INVENTION

The present inventors provide a radio tag that can harvest radio energy from a querying device and use this for active one-directional communication, overcoming the problem of dual path loss. Longer-range communication using such harvested energy is made practical by using a query process where the information defining the communication is primarily contained in a query to the radio tag allowing the transmission from the radio tag to be short and energy-efficient. The exciting RF energy source (providing the energy for harvesting and the query) can also be separated from the tag reader, overcoming the problems of energy harvesting range and self interference as well as greatly increasing the number of tags that can be serviced by a given reader.

More specifically, in one embodiment, the invention provides a radio tag having a sensor input for receiving a sensed condition signal and an antenna for receiving and transmitting radio power. An energy harvesting circuit and a radio receiver communicate with the antenna for harvesting energy and extracting a query signal, respectively. In addition, a radio transmitter communicates with the antenna to transmit an answer signal deriving power from the harvested radio power and, based on the sensor input, the query signal.

It is thus a feature of at least one embodiment of the invention to provide an active radio (that is, not relying on backscatter) operating on harvested radio frequency energy (that is, not using a battery) to communicate sensor data.

The radio tag may include an address storage memory holding a radio tag address and the radio frequency may further communicate with the antenna to extract a query address so that the radio transmitter transmits an answer signal only when the query address matches the radio tag address.

It is thus a feature of at least one embodiment of the invention to allow multiple radio tags to concurrently receive and respond to a query signal, for example, from a single querying device and in a pool of radio tags that may need different queries and may have interference among the radio tags.

The answer signal may convey only a single bit of information

It is thus a feature of at least one embodiment of the invention to minimize the energy cost of the transmitted information making RF energy harvesting practical. Versatility of the radio tags to communicate different information is preserved by offloading the information associated with the response into the query itself.

The radio transmitter may be programmable to change a center frequency of the answer signal within a larger frequency range of the radio transmitter.

It is thus a feature of at least one embodiment of the invention to allow concurrent information transfer from multiple radio tags using frequency division multiplexing, thus facilitating the use of a remote reader that can cover multiple radio tags concurrently.

The query signal may be a threshold and the answer signal may indicate whether the sensed condition signal has a value above or below the threshold.

It is thus a feature of at least one embodiment of the invention to provide an extremely low computational burden for the radio tags that can be achieved with energy efficient gates and discrete circuitry or its equivalent.

In some cases, the radio tag does not contain a battery.

It is thus a feature of at least one embodiment of the invention to provide a long lived radio tag with a comparable cost structure to passive RFID tags.

The answer signal may be transmitted during a time period when radio power suitable for harvesting is not received from the antenna.

It is thus a feature of at least one embodiment of the invention to eliminate the problem of self-interference to maximize reader distance from the RFID tag.

These particular objects and advantages may apply to only some embodiments falling within the claims and thus do not define the scope of the invention.

DETAILED DESCRIPTION OF THE PREFERRED EMBODIMENT

Figure 1:
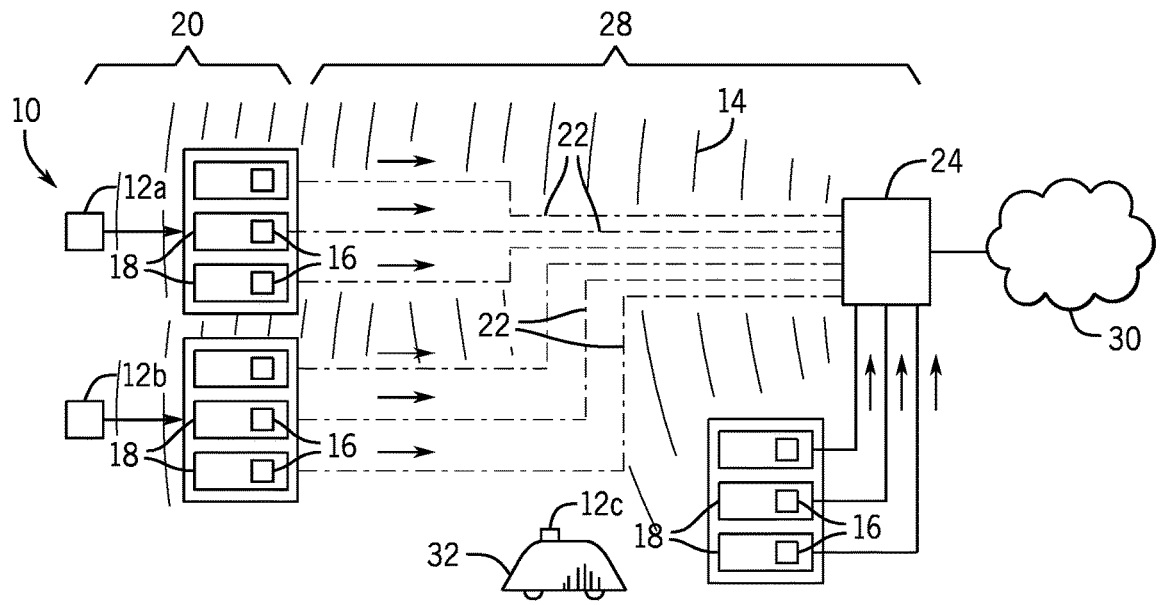
FIG. 1 is a simplified block diagram of a system constructed according to the teachings of the present invention and having multiple query devices, radio tags, and a reader device showing the relatively greater distance possible between the radio tags and the reader device compared to the distance between the radio tag and a query device providing RF energy to the radio tags, and further showing both stationary and mobile query devices.

Referring now to FIG. 1, a radio tag system 10 may include one or more query devices 12a, 12b, and 12c generating free space, electromagnetic, radiofrequency query signals 14 that may be received by radio tags 16, for example, attached to products 18 in warehouse bins or shelves or in shipping containers during various stages of transport or the like. As will be discussed below, the query signals 14 provide a source of energy to the radio tags 16 and for this reason will generally be positioned in close proximity 20 to the radio tags to 16, for example, less than 24 meters away.

Each of the radio tags 16 will use the query signals 14 to in turn generate free-space, electromagnetic, radiofrequency answer signals 22 which may be received by a reader device 24. The reader device 24 may also receive the original query signals 14. As will be discussed in greater detail below, the query signals 14 will define information sought from the radio tags 16 and complete the information provided in the answer signals 22 received by the reader device 24. The completed information assembled from the query signal 14 and the answer signals 22 can then be communicated to other devices, for example, over the Internet 30 or the like.

Generally, the radio tag 16 may provide for packaging similar to that used by RFID tags including small plastic housings or laminated paper and circuitry stickers for adhesive attachment.

Referring still to FIG. 1, the reader device 24 may be positioned much farther from the radio tag 16 than the close proximity 20, for example, being positioned at a far proximity 28 from the radio tag 16, permissibly greater than 24 meters and typically greater than 200 m. This greater distance is possible because the reader device 24 does not need to provide wireless power to the radio tag 16 and because there is no self-interference from such power. In addition, the radio tags 16 will employ an active transmitter having a higher signal strength than obtained with backscatter.

According to the close and far proximities 20 and 28, in some embodiments, the query devices (e.g., 12a and 12b) may be at fixed locations, for example, in a warehouse or at loading docks or at a point of product transfer where the radio tags 16 will come within the close proximity 20. Alternatively, or in addition, the query device (e.g., 12c) may be attached to a mobile platform such as a robotic cart 32 to move among product 18. More generally, the reader device 24 may be stationary because of the substantially greater range of the far proximity 28 and the ability of the system to accommodate and distinguish among a large number of radio tags 16 as will be described below.

Figure 2:
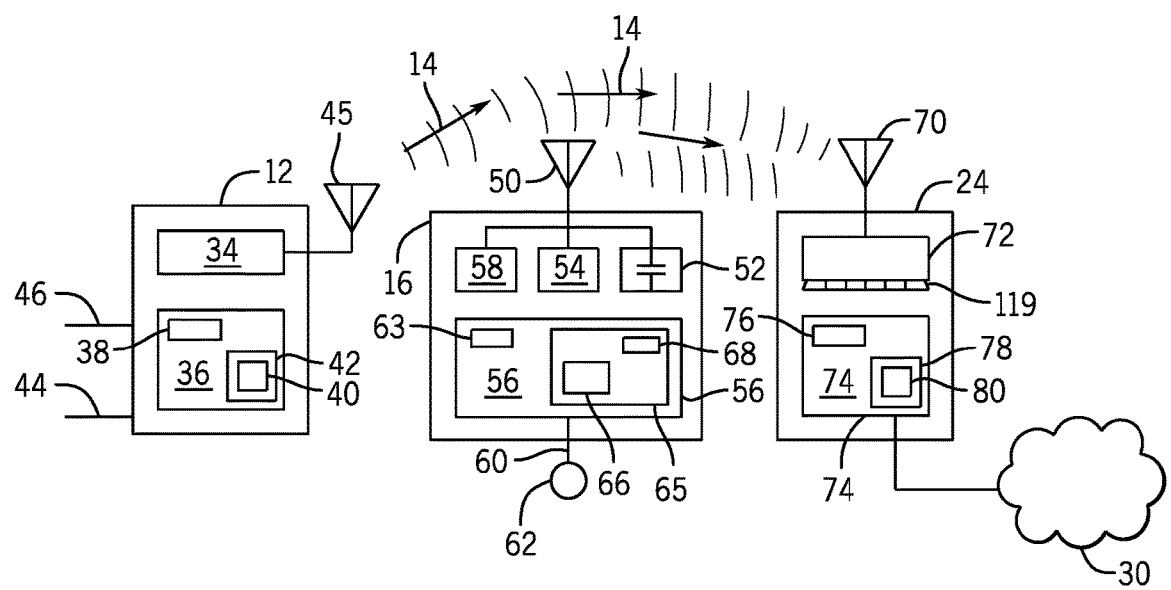
FIG. 2 is a block diagram of each of a query device, radio tag, and reader device.

Referring now also to FIG. 2, the query devices 12 will generally provide a radio transmitter 34, for example, as part of a transceiver under the control of an electronic computer 36 having a processor 38 and executing a stored program 40 held in computer memory 42. In one nonlimiting embodiment, the transmitter 34 may be a narrowband radiofrequency transceiver from Texas Instruments of Texas, USA, available under the trade name CC1125 and providing amplitude shift keying (ASK). Each query device 12, may provide query signals 14 to multiple radio tags 16 within the proximity 20 and thus the number of query devices 12 may be fewer than the number of radio tags 16 and accordingly can be substantially more expensive and complex than the radio tag 16 while preserving scalability. In cases when the query devices 12 are stationary, they may be attached to a stationary power source 44 such as a power line or a substantial battery or other power source capable of supporting high-energy radio transmissions through antenna 45 that can be harvested for energy by the radio tags 16. As will be discussed below, the query signal 14 provides not only energy to the radio tag 16 but a specific query to which the radio tag 16 responds. This query may change dynamically under the control of the program 40, for example, triggered by time of day or by command through a data connection 46 with an external computer system or the like.

In contrast to the query device 12, the radio tags 16 will generally be large in number and thus designed for simplicity and low cost. Each of the radio tags 16 will provide an antenna 50 communicating with an energy harvesting circuit 52, a radio receiver 54, and a radio transmitter 58. The energy harvesting circuit 52 captures energy from the query signal 14 to store it in a capacitor for later use. In one embodiment, the energy harvesting circuit 52 may be a half-wave rectifier with a 15-stage Dixon charge pump using Schottky diodes, for example, commercially available from Skyworks under the trade name SMS7630-040LF. This energy harvesting circuit 52 is able to harvest incident RF power as low as −21.67 dBm to charge a storage capacitance of 6.8 µF to a voltage of 1.8 V.

As noted, the antenna 50 also communicates with radio receiver 54 in the tag, operating to decode an address contained in the query signal 14 (as will be discussed below so that other circuitry of the radio tag 16 may be awoken upon receipt of a properly addressed query signal 14. By using a simple amplitude shift keying (ASK) for the query signal 14, the receiver 54 may be a simple envelope detector using, for example, a Schottky diode (cited above) and a comparator having extremely low power consumption.

Upon receipt of a matching address in the query signal 14, a controller 56 and transmitter 58 are switched out of a low power consumption sleep mode to begin operation. The controller 56 may further communicate with the receiver 54 to receive a query extracted from the query signal 14 and will control a transmission of an answer through the transmitter 58. In this respect, the controller 56 provides a sensor input 60 communicating with a sensor 62, for example, a temperature sensor, a humidity sensor, or other sensor producing a measurable electrical signal. The controller 56 uses the query and the sensor signal to formulate a response to the query signal 14 in the form of an answer that will be transmitted by the transmitter 58.

The radio transmitter 58 provides an active transmitter (in contrast to a backscatter transmission of a conventional passive RFID tag) and, in one example, may encode the answer from the controller 56 using frequency shift keying (FSK) modulation distinct from the ASK modulation of the query device 12. Importantly, the radio transmitter 58 is programmable to transmit in any of a set of sub-bands, for example, within an ISM band of 902-928 MHz. A transmitter suitable for this use is available from On Semiconductor of Arizona, USA, under the trade name AX5043 and provides a transmission center frequency that may be programmed by the setting of control bits on the transmitter. In this way, individual radio tags 16 may be easily programmed to have a different center frequency of transmission, typically of more than 500 center frequencies, to implement frequency division multiplexing.

The controller 56 is depicted functionally as a processor 63 communicating with an electronic memory 65 holding a program 66 and a cluster address value 64 (to be described below) of the radio tag 16. Preferably, however, the controller 56 will be implemented either as discrete circuitry (which may also implement some of the functions of other circuit blocks of the radio tag 16) for reduced cost and energy consumption.

Referring still to FIG. 2, it is important to note that the radio tag 16 does not require a battery and in key embodiments will be battery-free for low cost, long life, and simplicity. Nevertheless, it is contemplated that a battery or other source of energy (e.g., photovoltaics) may be used to supplement the radiofrequency energy harvesting, for example, in applications where the radio tag 16 will periodically be out of range of a query device 12, for example, when the radio tag 16 is used as part of a wearable device.

Referring still to FIG. 2, the reader device 24 will also provide an antenna 70 which will be connected to a wideband receiver 72 that can receive both ASK signals of the query signal 14 and the signals of the answer signal 22 in any of the sub bands of the transmitter 58. In one example, the wideband receiver 72 may be a software defined radio receiver available from Ettus Research of Austin, Texas, USA, under the trade name USRP B200, operating from 70 MHz to 6 GHz and able to simultaneously demodulate multiple different channels in separate frequency bands associated with different radio tags 16 as will be discussed below. The receiver 72 may also communicate with a local controller 74 having one or more processors 76 communicating with electronic memory 78 holding a stored program 80. This program will be discussed in more detail below and may communicate, for example, with the Internet 30 or other communication network. The reader device 24 may be more expensive than the query devices 12, and much more expensive than a radio tag 16 to the extent that it may handle a large number of radio tags 16 and thus allow for scalability largely unconstrained by reader cost.

Figure 3:
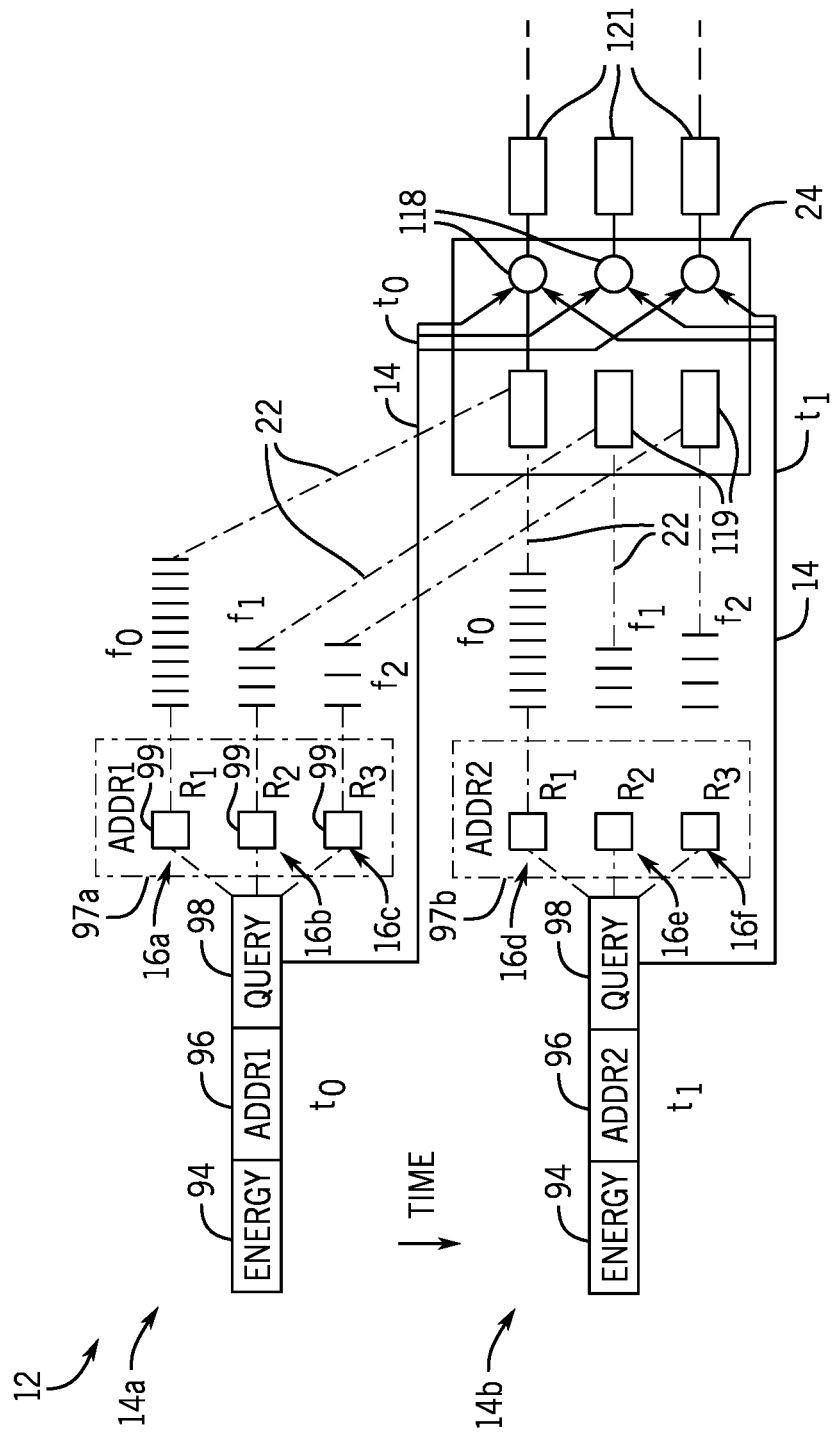
FIG. 3 is a dataflow diagram showing transmission of a query from a query device to a radio tag, the query including an energy header, address, and query, and the transmission of an answer from the radio tag to a reader.
Figure 4:
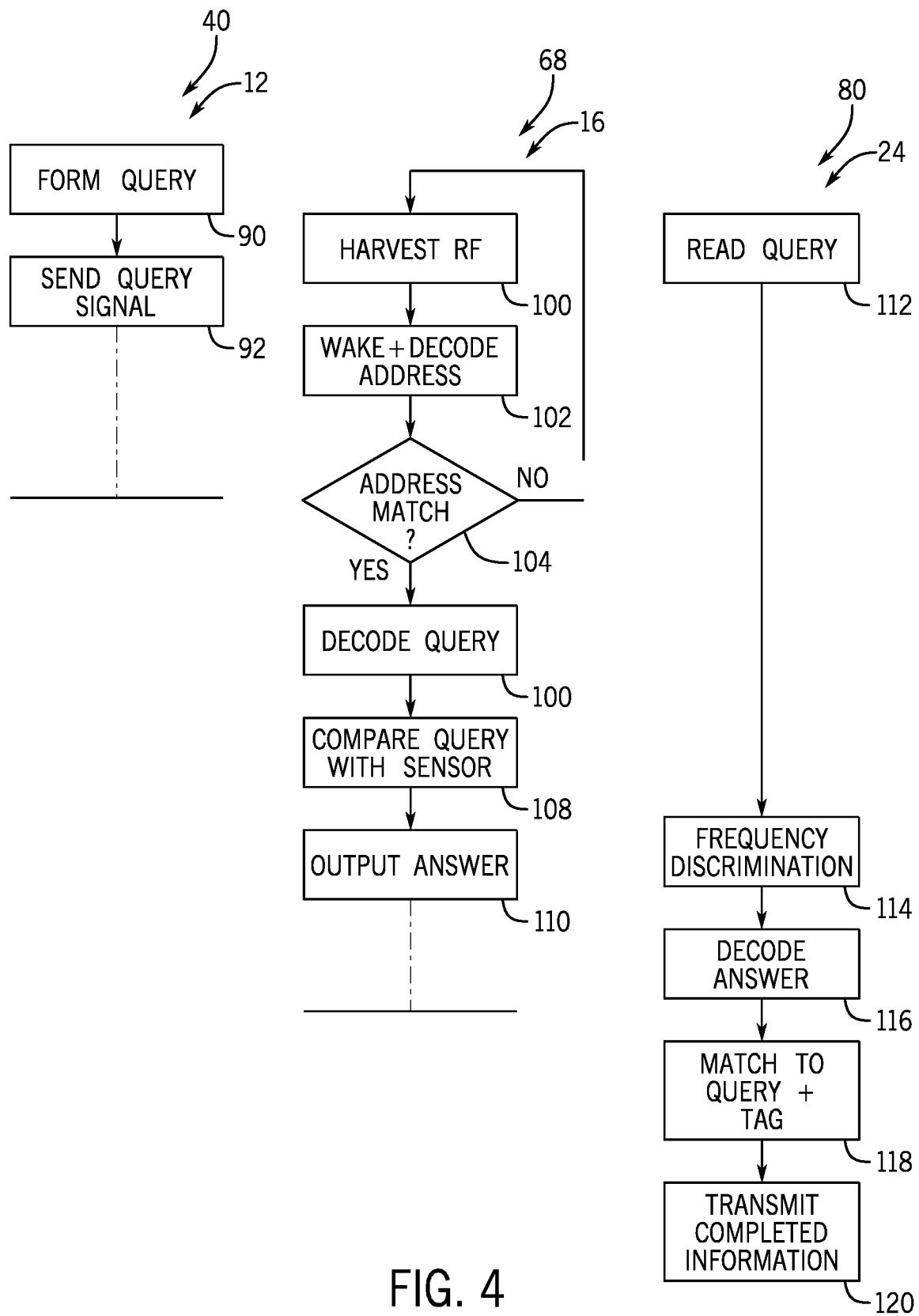
FIG. 4 is a flowchart showing programs executed respectively by the query devices, radio tags, and reader device in relative time alignment.

Referring now also to FIGS. 3 and 4, during use of the radio tag system 10 and under the control of program 40, the query devices 12, as indicated by process block 90 may formulate a multi-bit query 98 constructed to obtain desired information from radio tags 16. In some cases the formulation of the query of process block 90 may be trivial to the extent that the query 98 is always the same; however, the invention allows the query 98 to be changed over time or under different conditions, for example, accommodating different temperature thresholds in the transportation of product at different stages. By changing the query 98, programming of the tags 16 need not be changed in order to obtain a different information answer.

At process block 92, the query 98 is transmitted together with a proceeding energy preamble 94 and cluster address 96. The energy preamble 94 provides synchronization for the ASK receiver 54 of the radio tags 16 and the radiofrequency energy necessary to wake the tag 16 up and provide sufficient power for their subsequent operation in providing an answer signal 22. In one example, the energy preamble 94 may be a set of logical ones (bursts of constant amplitude carrier signal).

The cluster address 96 allows a query to be directed to specific clusters 97 of radio tags 16 in parallel as will be discussed in more detail below.

The query itself, for example, provides in effect a question which the radio tag 16 must answer. Separate query signals 14a and 14b may provide different queries at different times to and ti to different clusters 97a and 97b by changing the address 96 from a single query device 12 or from different query devices 12 sufficiently separated to prevent interference.

In a simple case, the query 98 may provide a detection threshold, for example, a temperature limit or humidity limit or the like operating to instruct the radio tag 16 to compare its sensor value to that threshold and to provide an answer 99 as to whether the sensor value is above or below that threshold. In this respect, the query 98 may provide multiple bits of information (for example, 8 bits of information to define 256 different threshold levels). In contrast, an answer 99 developed by the radio tag 16 may be a single bit of information to define two different states (above or below). The desired information requires knowledge of both the query 98 and the answer 99 to be complete; however, the present invention, by employing a highly asymmetrical partitioning of the information to be primarily in the query 98, permits an extremely short and energy-efficient answer 99 rendering long distance communication by the radio tag 16 using radio harvested energy practical.

Answers 99 are not necessarily limited to binary answers; however, the invention contemplates that the information conveyed to the reader device 24 predominantly will be carried by the query signal 14 in comparison to the answer signal 22. The information conveyed may be distinguished from the number of bits used to transmit the information which may be increased, for example, using multi-bit encoding for binary values of an answer 99, to provide for noise resistance. As used herein, the term information can be related to the number of distinct levels that can be distinguished in the decoded data. In this respect the information in the answer 99 will desirably be less than the information in the query 98.

It will be appreciated that even when the answer 99 is limited to a binary state, the ability to issue sequential queries 98 having different values can allow the radio tag 16 to communicate multi bit data (for example, a serial number) through successive queries having different ranges implementing, for example, in a binary search. This approach comes at the cost of greatly increased latency but may be used to augment sensor readings, for example, when it is desired to read a radio tag address, cluster rank number, or the like, for example, during configuration.

In one embodiment, the query 98 may be formulated as a set of control bits and a set of query bits, with the control bits serving as a mask for the query bits. The masked query bits are compared on a bit-by-bit basis with the sensor data with masked bits are treated as "don't care" states. This approach allows flexible definition of ranges of inequalities with a simple logic gate comparison circuit using extremely low power.

All radio tags 16 in range of the query device 12 transmitting the query signal 14 will be able to harvest energy as indicated by process block 100 and may wake up and decode the address 96 per process block 102. Wake up will only occur when a sufficient amount of energy has been stored to allow proper operation of the radio tag 16, for example, detected by a threshold of voltage on a storage capacitor.

Upon wake up, the decoded address 96 will be compared against the stored cluster address value 64 in the radio tag 16 defining the cluster 97 of the radio tag 16, and if this address 96 matches the cluster address value 64, as indicated by decision block 104, the query 98 is decoded to provide, for example, a sensor threshold per process block 106.

At process block 108, the radio tag 16 then compares the query 98 to the sensor value received by a sensor input 60 to formulate an answer 99 according to that comparison, the content of the answer 99, for example, true being if the sensor signal is above the query 98 and false being if the sensor signal is below the query 98. This simple comparison process may be implemented with correspondingly simple hardware to greatly reduce the power consumption of the radio tag 16.

At process block 110, the radio tags 16 each concurrently output an answer 99 using the transmitter 58. Interference between the different radio tag 16 of a given cluster 97 is avoided because each radio tag 16 of a given cluster 97 transmits in a different frequency band corresponding to a cluster rank of the radio tag 16 (for example, from 0 to 500). These different frequency bands also help identify particular radio tags 16 without the need for transmission of identifying address information or the like. The particular frequency band used by each radio tag 16 may be preprogrammed in order to facilitate the use of the radio tag 16, for example, by setting particular bits in the transmitter 58 discussed above, or radio tags may be programmed after deployment, for example, using a separate programming protocol operating through receiver 54 which may also or alternatively be used to change the cluster address value 64. In the former case, where the radio tags 16 are preprogrammed, the radio tags 16 of a given cluster 97 may be packaged together and may be visibly marked with a cluster identifier (corresponding but not necessarily equal to the cluster address value 64) and a cluster rank number corresponding to the center band of transmission of the answer signal 22 by the particular radio tag 16. This allows the radio tag 16 to be used without duplication in cluster and cluster rank and for the signals from the radio tags 16 to be readily related to a given product 18 (shown in FIG. 1).

Referring still to FIGS. 3 and 4, program 80 of the reader device 24 controls the reader device 24 which may be always on and is typically connected to an external power source such as line voltage. As such, the reader device 24 will receive the query signal 14 and thus have knowledge of the query 98 as indicated by process block 112. Immediately thereafter, when the answer signals 22 are received from the radio tags 16, as indicated by process block 114, the reader device 24 separates each answer signal 22 according to frequency band, for example, using a bank of bandpass filters 119 and uses demodulation circuitry, for example, implemented by controller 74 to separately decode each answer 99 per process block 116.

As indicated by process block 118, in this decoding process, the answers 99 are linked to particular radio tags 16 (according to their frequency band) and to the query 98 of the query signal 14 providing a complete set of information necessary to understand the received data. This collected information 121 may then be forwarded, for example, for other processing or to other systems as indicated by process block 120.

It will be appreciated that the use of a separate query device 12 and reader device 24 alone provides the benefit of expanding the distance between the reader device 24 and the radio tag 16 beyond that normally available with RFID tags. In this respect, the query device 12 need not provide a query and, in some embodiments, could provide only RF harvestable energy with the radio tag 16 having a static query value. Further, it will be understood that other methods of distinguishing the answer signals 22 of a cluster 97 may be used including, for example, time-division multiplexing in which answer signals 22 are delayed by a radio tag with unique predefined hold off periods before transmission to prevent interference or the use of address values 64 unique to each radio tag 16. These latter approaches, however, greatly increase the latency of transmitted data.

It will be appreciated that the query signal 14 may also provide information uniquely identifying the query device 12 (effectively a query device address) which may be processed only by the reader device 24 but that serves to provide additional information to the reader device 24 about the location of the radio tag 16 when a particular product 18 needs to be identified.

The inventors contemplate that the invention may also be used without the reader device 24 at certain times with the query device 12 operating in the capacity of the reader device 24, for example when only local communication is required.

The radio tag system 10 described above has application not only in warehouses for tracking stored materials or for tracking products in motion in the transportation chain but also for temperature monitoring in smart buildings and data centers as an alternative to IoT (Internet of Things) type approaches. The radio tag system 10 also has application for wearable devices such as patient monitors where localized query devices 12 can evoke responses in radio tags 16 that reveal a patient location as well as sending the data.

Certain terminology is used herein for purposes of reference only, and thus is not intended to be limiting. Generally, the use of the term radio means wireless communication of radiofrequency signals at 1 gigahertz (1 GHz) or lower frequencies. References to "controller" and "a processor" or "the microprocessor" and "the processor," can be understood to include one or more microprocessors or functionally equivalent circuit such as FPGAs or ASICs that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory and programs, unless otherwise specified, can include one or more processor-readable and accessible memory elements and/or components that can be internal to the processor-controlled device, external to the processor-controlled device, and can be accessed via a wired or wireless network and which may be held and implemented in read-only memory, write only memory, or in electrical interconnections (in the case of FPGAs or ASICs). The term active radio is used to refer to a radio transmitter that does not backscatter and passive radio tag to a tag that does not require a battery for transmission.

Terms such as "upper", "lower", "above", and "below" refer to directions in the drawings to which reference is made. Terms such as "front", "back", "rear", "bottom", and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including", and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be taken.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. A radio tag comprising:
   a sensor input for receiving a sensed condition signal;
   at least one antenna for receiving and/or transmitting radio power;
   an energy harvesting circuit communicating with the at least one antenna to harvest radio power from the antenna and store the same;
   a radio receiver communicating with the at least one antenna for extracting a query signal; and
   a radio transmitter communicating with the at least one antenna to transmit an answer signal deriving power from the harvested radio power, the answer signal containing a value that changes based on the sensor input and the query signal.

2. The radio tag of claim 1 wherein radio transmitter is programmable to change a center frequency of the answer signal.

3. The radio tag of claim 1 wherein the query signal is a threshold and the answer signal indicates whether the sensed condition signal has a value above or below the threshold.

4. The radio tag of claim 1 wherein the radio tag does not contain a battery.

5. The radio tag of claim 1 wherein the answer signal is transmitted during a time period when radio power suitable for harvesting is not concurrently received from the antenna.

6. A radio tag comprising:
   a sensor input for receiving a sensed condition signal;
   at least one antenna for receiving and/or transmitting radio power;
   an energy harvesting circuit communicating with the at least one antenna to harvest radio power from the antenna and store the same;
   a radio receiver communicating with the at least one antenna for extracting a query signal;
   a radio transmitter communicating with the at least one antenna to transmit an answer signal deriving power from the harvested radio power and based on the sensor input and the query signal; and
   further including an address storage memory holding a radio tag address and wherein the radio frequency receiver further communicates with the at least one antenna to extract a query address and wherein the radio transmitter transmits an answer signal only when the query address matches the radio tag address.

7. A radio tag comprising:
   a sensor input for receiving a sensed condition signal;
   at least one antenna for receiving and/or transmitting radio power;
   an energy harvesting circuit communicating with the at least one antenna to harvest radio power from the antenna and store the same;
   a radio receiver communicating with the at least one antenna for extracting a query signal;
   a radio transmitter communicating with the at least one antenna to transmit an answer signal deriving power from the harvested radio power and based on the sensor input and the query signal; and
   wherein the answer signal conveys only a single bit of information.

8. A radio tag system comprising:
   (a) at least one query device transmitting a first radio signal including an encoded query signal;
   (b) at least one radio tag each having:
      a sensor input for receiving a sense condition signal;
      at least one antenna for receiving or transmitting radio power;
      an energy harvesting circuit communicating with the at least one antenna to harvest radio power from the first radio signal and storing the same;
      a radio receiver communicating with the at least one antenna for extracting the query signal; and
      a radio transmitter communicating with the at least one antenna to transmit the harvested radio power as a second radio signal providing an answer signal containing a value that changes based on the sensor input and the query signal; and
   (c) a reader device reading the second radio signal to extract the answer signal.

9. The radio tag system of claim 8 wherein the answer signal is transmitted during a time period when radio power suitable for harvesting is not received from the antenna.

10. The radio tag system of claim 8 wherein the radio tag system includes a plurality of radio devices having a radio transmitter providing second radio signals in different frequency bands.

11. The radio tag system of claim 8 wherein each of the at least one radio tag has an address storage memory holding a radio address and wherein the at least one query device further communicates a query address extracted by the radio frequency receiver of the at least one radio tag; and
   wherein the radio transmitter of the at least one radio tag transmits an answer signal only when the query address matches the radio tag address.

12. The radio tag system of claim 8 wherein the query device is on a mobile platform moving with respect to the at least one radio tag.

13. A radio tag system comprising:
   (a) at least one query device transmitting a first radio signal including an encoded query signal;

(b) at least one radio tag each having:
a sensor input for receiving a sense condition signal;
at least one antenna for receiving or transmitting radio power;
an energy harvesting circuit communicating with the at least one antenna to harvest radio power from the first radio signal and storing the same;
a radio receiver communicating with the at least one antenna for extracting the query signal;
a radio transmitter communicating with the at least one antenna to transmit the harvested radio power as a second radio signal providing an answer signal based on the sensor input and the query signal;
(c) a reader device reading the second radio signal to extract the answer signal; and
wherein the reader device is positioned at least 10 times farther from the radio tag than the query device.

14. A radio tag system comprising:
(a) at least one query device transmitting a first radio signal including an encoded query signal;
(b) at least one radio tag each having:
a sensor input for receiving a sense condition signal;
at least one antenna for receiving or transmitting radio power;
an energy harvesting circuit communicating with the at least one antenna to harvest radio power from the first radio signal and storing the same;
a radio receiver communicating with the at least one antenna for extracting the query signal;
a radio transmitter communicating with the at least one antenna to transmit the harvested radio power as a second radio signal providing an answer signal based on the sensor input and the query signal;
(c) a reader device reading the second radio signal to extract the answer signal; and
wherein the reader device is positioned greater than 100 m from the radio tag.

\* \* \* \* \*